United States Patent [19]

Preston et al.

[11] Patent Number: 5,052,040
[45] Date of Patent: Sep. 24, 1991

[54] MULTIPLE USER STORED DATA CRYPTOGRAPHIC LABELING SYSTEM AND METHOD

[75] Inventors: Harold W. Preston, Carrollton; Jeffrey R. Rush, Richardson, both of Tex.

[73] Assignee: Micronyx, Inc., Richardson, Tex.

[21] Appl. No.: 529,107

[22] Filed: May 25, 1990

[51] Int. Cl.⁵ .............................................. H04L 9/32
[52] U.S. Cl. ........................................ 380/4; 380/25; 380/50; 340/825.31; 340/825.34
[58] Field of Search ................ 364/200, 900; 380/3, 380/4, 23-25, 45-47, 49, 50; 340/825.31, 825.34

[56] References Cited

U.S. PATENT DOCUMENTS

| | | | |
|---|---|---|---|
| 4,713,753 | 12/1987 | Boebert et al. | 364/200 |
| 4,835,682 | 5/1989 | Kurachi et al. | 364/200 |
| 4,864,616 | 9/1989 | Pond et al. | 380/25 |

Primary Examiner—Thomas H. Tarcza
Assistant Examiner—Bernarr Earl Gregory
Attorney, Agent, or Firm—Baker & Botts

[57] ABSTRACT

There is disclosed a system and method of extending the labels on an encryption technique so that different users can utilize the same files under different rights established by both the user and the system administrator. This system and method take advantage of an extension of the file label which contains configuration capabilities and user rights and privileges to that file. The extended labeling is expandable so that several users can each be identified having specific rights and specific encryption capability with respect to the file.

19 Claims, 5 Drawing Sheets

*FIG. 3*
CAPABILITIES LIST FORMAT

FIG. 7
LABEL CREATION

FIG. 8a
FILE ACCESS

MULTIPLE USER STORED DATA CRYPTOGRAPHIC LABELING SYSTEM AND METHOD

TECHNICAL FIELD OF THE INVENTION

This invention relates to encryption systems and more particularly to a system for expanded labeling of standard data so that multiple users can have individual privileges with respect to a given file.

BACKGROUND OF THE INVENTION

One system for controlling access to a data file is shown in U.S. Pat. No. 4,864,616 issued Sept. 5, 1989 and hereby incorporated by reference herein. This prior system is a labeling mechanism which enabled encryption of a file and also enabled a limited number of access restrictions to the file. It also enabled identification of the owner of the file to be established. The access limitations in the existing labeling system are restricted to a few restrictions, such as the file owner, the company, and the machine.

Users of such data access control systems in general desire to limit access to files in a more specific way. They want to be able to specify read only access to a file to particular users and give other users read/write access to the same file. They also want to have a category for allowing full access to a group of individuals for certain files. There are also situations where numerous users must be able to write to a file while allowing only a limited number of people to access the file for reading purposes.

The existing labeling system does not have such capabilities and thus it must be enhanced so that the system has capability for administration and record keeping type tasks.

A further problem exists when PCs are used since any PC could have a multiplicity of users. Also, the data for any PC is easily appropriated by either removing the diskette where the data is stored or by taking the hard drive from the system or by dumping the entire system data and files onto an alternate diskette. Thus, data which one would assume to be securely locked in a room could be moved to a different PC. Therefore, any source must be arranged so that data which is created on one machine cannot be read from another machine.

Accordingly, there exists a need in the art for a cryptographic system which allows for a plurality of users, each with a different data access capability and which also allows certain user restrictions and rights to be granted both by the user and by a system administrator.

There also exists in the art a need for a secure cryptographic system where different decoding keys can be used for different files under control of a file creator.

SUMMARY OF THE INVENTION

Our cryptographic system enhances the existing labeling systems by adding an extended label on the end of the existing standard label. The added label has two main sections. The first section describes capabilities for the file which include the configuration that the file was created on, the owner of the file and the machine that it was created on, plus any special algorithms that may be used on the files. The second section describes the rights list which includes access to the file and contains unique I.D.'s for each of the users that have access to a file as well as their defined privilege rights and their defined user rights.

The capability section is made up of two parts. It has an I.D. which is a unique identifier and which is followed by a capability section which identifies what this unique identifier is for. For example, an I.D. could be the unique user I.D. of the owner of the file and the capabilities would indicate that this is the owner of the file. The I.D. could be: (1) the configuration I.D. of the system that the file was created on and the capability section identifies it as being the configuration I.D.; or (2) the unique I.D. could be for the machine that the file was created on and the capability word to identify that machine; or (3) a special I.D.

The capability section is followed by a rights list which is a series of blocks for each user having access to the file. Each of the blocks contains three sections. One section is the unique I.D. of the user. This identifies the user to the system. The second and third sections of the block are a plurality of user rights. The rights define the individual user's rights to that file. They can be, for example, a read only right, where the person can read the file but cannot write to that file. Or the right can be a read/write access to the file which gives the user capability of reading or writing to the file. Or the right can be full access to the file where the user can rename the file, delete the file, read or write, and so forth. Or, the right can be defined where the user has no access to the file, or only limited reading of the file.

The main difference between the user rights and privilege rights is that the user rights are defined by the user who is creating the file. The privilege rights are a set of rights that the system administrator for the system sets for that user.

Accordingly, one technical advantage of this invention is that any given file can have different restrictions for different users with respect to that file, with some users having no rights, and other users having a multitude of different rights. Some of these rights are established by the system, and some are established by the user who creates the file.

Another technical advantage of the system is that the rights for any particular user can be changed independent of the rights of any other particular user of the system. Another technical advantage of this invention is that both the user and the system administrator can establish rights with respect to the particular user. In addition, any user can establish rights with respect to any other user with respect to files created by that user. Accordingly, this system allows for complete flexibility of the control of files created by various users.

Another technical advantage of this invention is that any user can establish, with respect to a file created by that user, any one of a number of encryption techniques previously established by the system administrator thereby allowing different files to be encrypted under different data schemes, or under different encryption/decryption keys.

BRIEF DESCRIPTION OF THE DRAWINGS

The foregoing objects, features and technical advantages, as well as others, of the invention will be more apparent from the following description of the drawings in which.

DETAILED DESCRIPTION OF THE INVENTION

Figure 1:
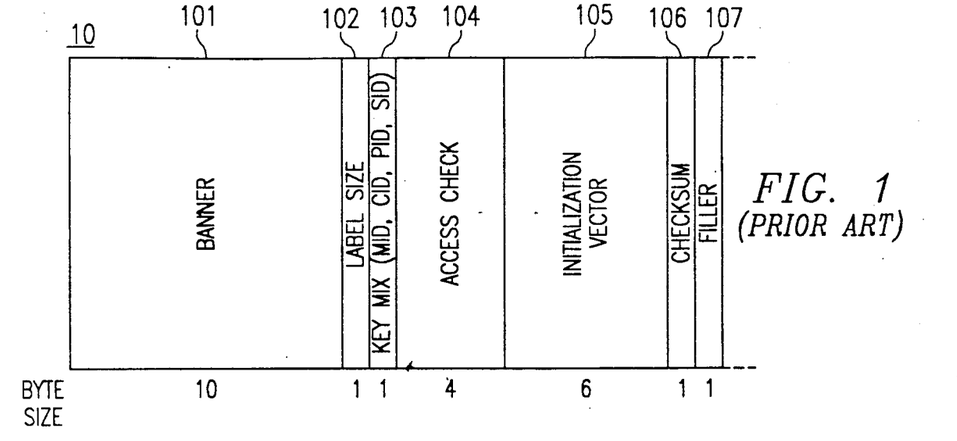
FIG. 1 shows a labeling arrangement of the prior art.

In order to provide instructions for encrypting and decrypting sensitive information, the method of the present invention utilizes a file label that is prefixed to the file. Before proceeding with a discussion of the expanded labeling concept, it would be helpful to review the prior art, as shown in the aforementioned U.S. Pat. No. 4,864,616. Referring to FIG. 1, label 10 is illustrated in block form to show the length in bytes and the position of the various fields of label 10. Banner 101 is a 10-byte field at the beginning of label 10 that contains the clear text announcement "Protected." Label size 102 is a 1-byte field that indicates the length of label 10. Label size 102 is included in label 10 to allow for various modifications to the length and contents of label 10. The remaining fields of label 10 include a key mix 103 (1 byte), an access check 104 (4 bytes), an initialization vector 105 (6 bytes), a checksum 106 (1 byte), and a filler 107 (1 byte) that is used to align label 10 on a 2-byte boundary of the file.

The key mix 102 is a single byte containing five bit flags. One of the bits is a label-is-present flag which indicates whether label 10 is to be considered present on the protected file. The label-is-present flag may be disabled temporarily to allow an encrypted file to be transferred (between PCs having the same configuration). This allows an encrypted file to be transferred such that the transmitting system will not automatically decrypt the file before transmission, as is normally the case. This makes the file act momentarily as an unlabeled file, since it is transmitted verbatim. This results in the file retaining its encrypted state during transmission for a more secure operation against eavesdropping. The remaining four bit flags of key mix 103 are used to designate which of the optional key streams are to be used to encrypt or decrypt the file.

When a protected file is created, it is always encrypted under a mandatory key stream. In addition, the creator of the file selects which of the optional keys are to be used for encryption, thereby setting the bit flags of key mix 103. Key mix 103 is included as a field in label 10 attached to the protected file to enable encryption thereby setting the bit flags of key mix 10. Key mix 10 is included as a field in label 10 attached to the protected file to enable decryption of the file using the key streams designated by key mix 10. Based on key mix 103 which is designated during creation of the protected file, the file can only be decrypted as follows:

(1) If MID is selected, the file can be decrypted only on the PC on which it was encrypted;

(2) If CID is selected, the file can be decrypted only on a PC sharing the same security configuration key with the PC on which the file was encrypted;

(3) If PID is selected, the file can be decrypted only by the same user who encrypted the file; and (4) If SID is selected, the file can be decrypted only by a user in the same group as the user who encrypted the file.

The data entered into the protected file is first encrypted under the mandatory key stream and then under each of the other key streams designated by key mix 103. Thus, the restrictions indicated above can be combined. For example, if MID and SID are both used to encrypt a file, then only a user in the same user group (i.e. a user having the same SID) who is logged-on to the same PC as the one on which the file was encrypted may read the protected file.

Access check 104 comprises 4 bytes of constant data which are encrypted according to the keys designated by key mix 103. For example, if key mix 103 designates MID and SID, access check 104 may comprise four characters (such as the word "TEXT") combined by a reversible function (such as Exclusive OR) with the MID and SID key streams.

The primary purpose of access check 104 is to confirm that a user requesting access to a protected file is qualified to access that file. An access code is generated for the requesting user in the same manner that access check 104 was generated during creation of the protected file. The requesting user is granted access to the protected file only if access check 104 of label 10 attached to the protected file is the same as the access code generated for the requesting user.

A secondary purpose of the access check 104 is to allow a security manager to decrypt an encrypted file having an unknown owner. The security manager is able to compare access check 104 with combinations of known keys (i.e. known to the security manager) combined according to key mix 103 to determine the correct key streams to use to decrypt the file.

Initialization vector ("IV") 105 is populated during creation of a protected file by filling IV field 105 with random or pseudo-random bits. The bits of IV field 105 are used to indicate a starting byte for each of the key streams utilized for encryption or decryption. IV field 105 may also include bits used to indicate the particular reversible function (such as Exclusive OR or Exclusive NOR) and the directions in which the key streams are applied for encryption and decryption of that particular file. The options of randomly determining which direction and which reversible functions are used for encryption and decryption provide additional levels of randomization in the encryption process.

Checksum 106 is a single, byte comprising a sum of label size 102, key mix 103, access check 104, and IV 105. Checksum 106 is used to detect tampering with the label and is also used as the initialization vector for encrypting key mix 103. Access check 104 and IV 105 use the mandatory key stream.

Figure 2:
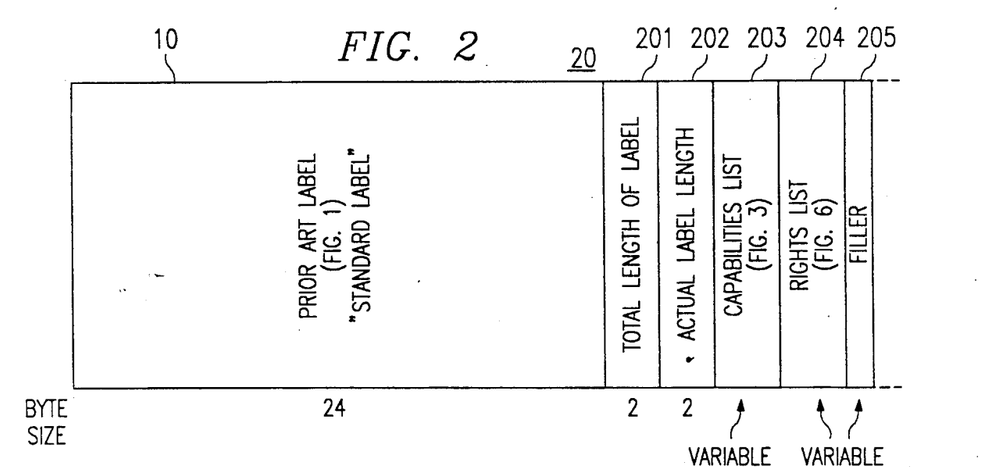
FIG. 2 shows an overall view of the expanded labeling technique of this invention as attached to the prior art label.

FIG. 2 shows the format of the discretionary access control (DAC) extended label which is added to the abovedescribed prior art label to control access to a file.

"Total length of label" field 201 is 2 bytes in length and contains the overall amount of space allocated for the extended label excluding "Standard Label" field 10.

"Actual label length" field 202 is 2 bytes in length and contains the length of the "Capabilities List" and the "Rights List."

"Capabilities List" field 203 is of variable length and is described in detail below.

"Rights List" field 204 is of variable length and is described in detail below.

Figure 3:
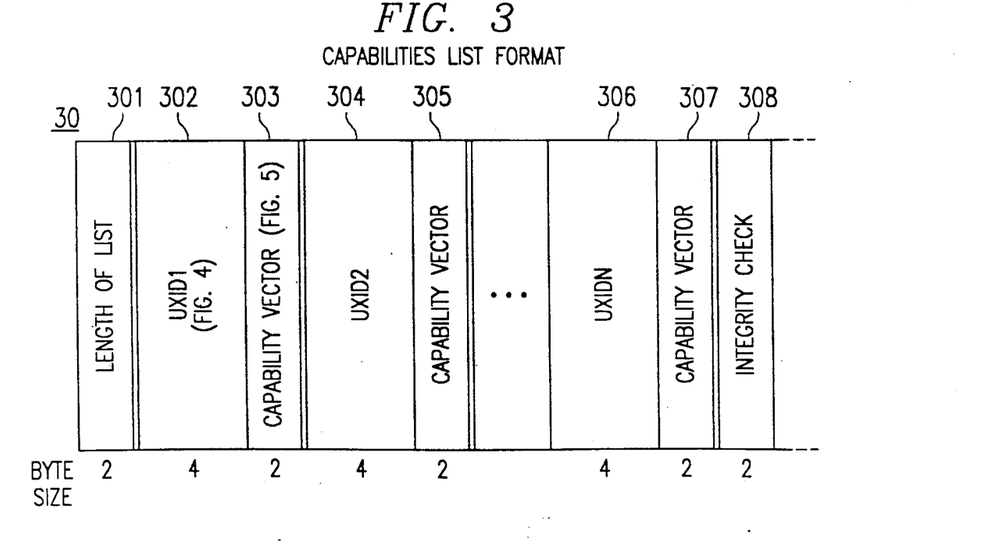
FIG. 3 shows the capabilities list format of the expanded labeling technique.

As shown in FIG. 3, capabilities format 30 has field 301 which is 2 bytes in length and contains the total length in bytes of the capabilities list.

Figure 4:
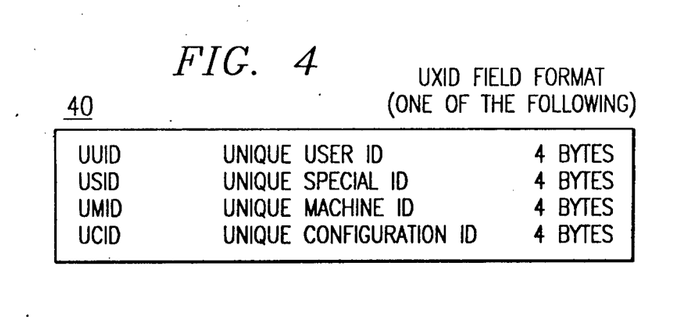
FIG. 4 shows the possibilities for the UxIT field of the expanded labeling format.

"UxID" field is 4 bytes in length and contains one of the following as shown in FIG. 4: (UUID) (unique user ID), USID (unique special ID), UMID (unique machine ID) or UCID (unique configuration ID). The UUID identifies the owner of the file, i.e., the creator of the file. The USID identifies special encryption algorithms used to encrypt the file as well as other application specific unique identifiers. The UMID identifies the machine on which the file was created and UCID identifies the configuration under which the file was created.

Figure 5:
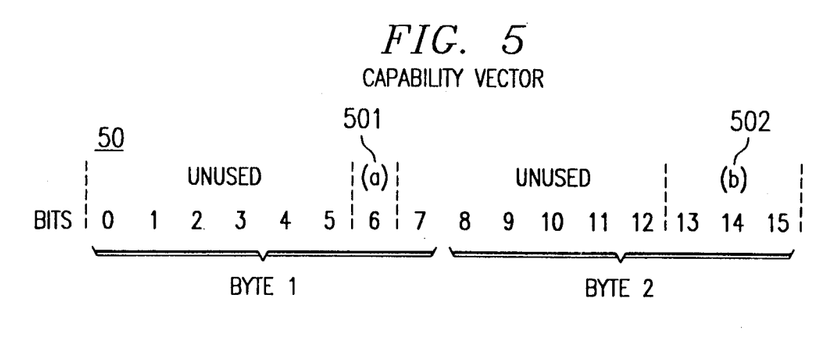
FIG. 5 shows the capability vector format of the expanded labeling technique.

"Capability Vector" field 50 is shown in FIG. 5 and is a 2 byte (16 bit) field with (a) bit 501 indicating that an alternate signature is to be used in encrypting the file; and (b) bits 502 containing the UxID class.

"Integrity Check" field 308 (FIG. 3) is a 2 byte field and contains the result of an algorithm performed on the preceding bytes of the capabilities structure. It is used to validate the integrity of this section of the file label.

Figure 6:
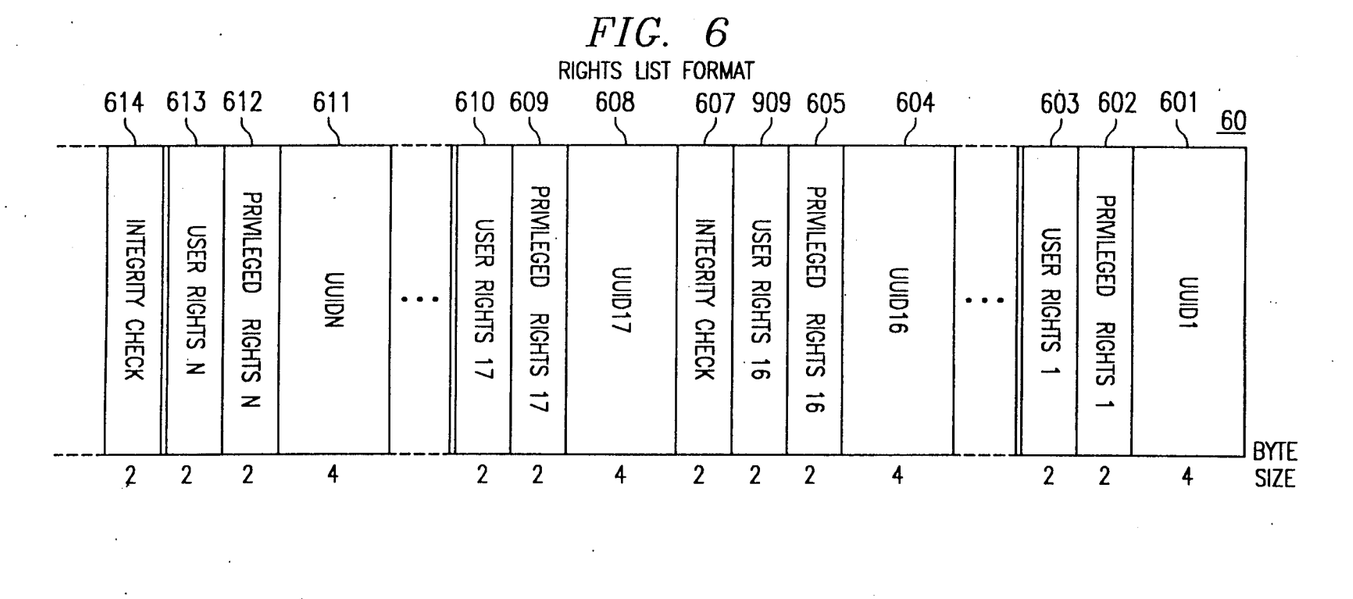
FIG. 6 shows the rights list format of the expanded labeling technique.

The rights list format 60 is shown in FIG. 6. "UUID" field 601 is 4 bytes in length and contains the unique user ID of the user for which the accompanying access rights to the file are defined.

"Privilege Rights" field 603 is 2 bytes in length and contains the rights (if any) that were defined by the system administrator for this file and this UUID.

"User Rights" field 603 is 2 bytes in length and contains the rights that were defined by the owner of the file for this file and this UUID. Privileged rights and user rights consist of one of the following:

The rights element of the user and privileged rights contain bits for each of the possible access conditions. More than one access bit can be set to reflect a composite access permission. Also note that if the no access bit is set, then all other access bits have no meaning. The access conditions are: read, write, execute, rename, delete, change attributes, create, machine lock, configuration lock, no access.

"Integrity Check" field 610 is a 2 byte field and contains the result of an algorithm performed on the bytes on the Rights List preceding this location in the list and following the prior "Integrity Check" field. It is used to insure the integrity of this section of the file label. It occurs in the Rights List after every 16 UUID/Rights elements and at the end of the Rights List.

Figure 7:
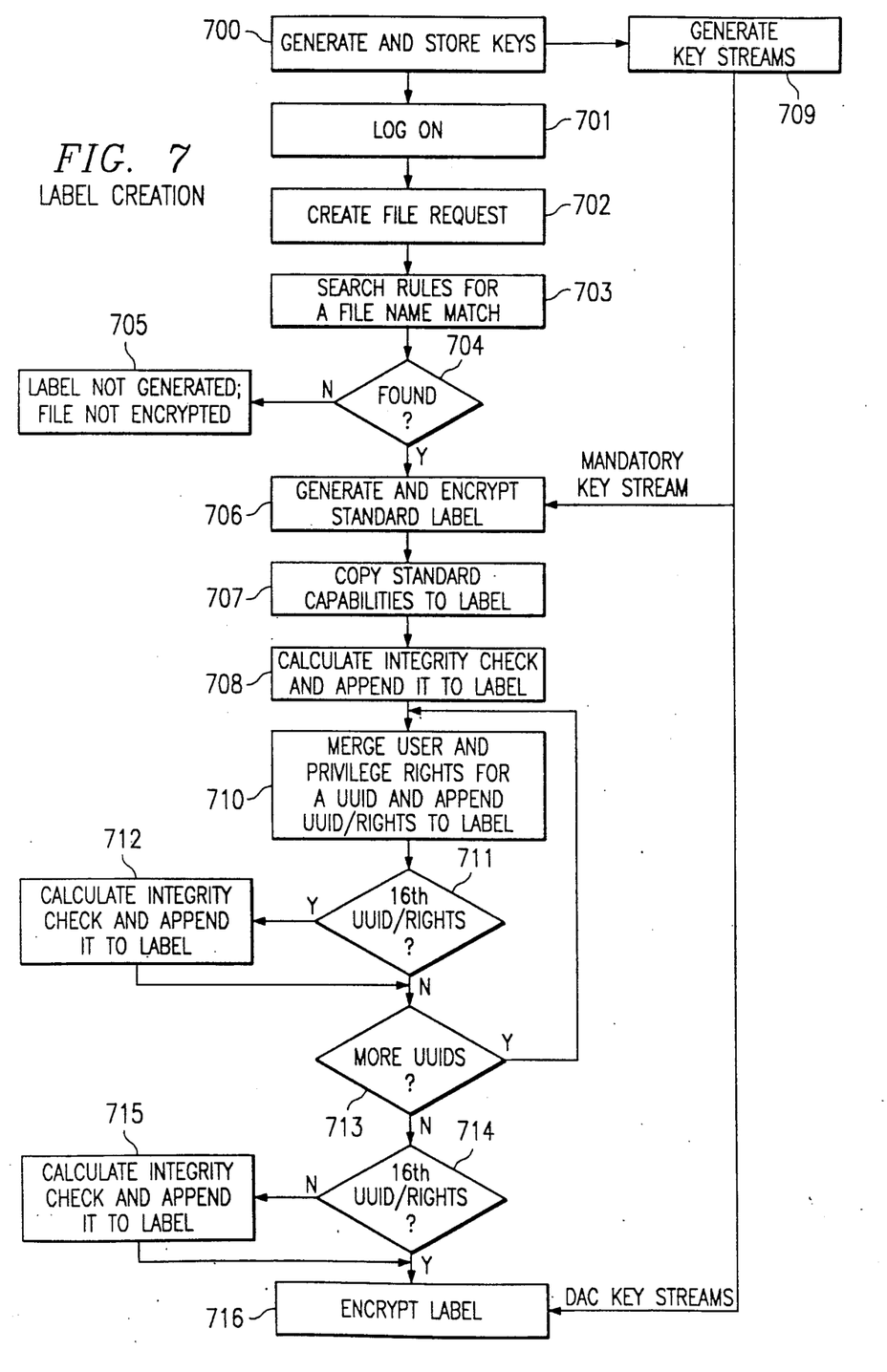
FIG. 7 shows the embodiment of a label creation algorithm.

Turning now to FIG. 7, there is shown a label creation algorithm which is utilized to create the label in the first instance by a user. At system boot up box 700 generates and stores the keys and prompts box 709 to generate key streams which will be used later in the procedure. When a user logs on the system, box 701 a user ID is established which is the UUID used in the label creation. When the user requests the creation of a file, box 702, the system searches through a set of rules that have been established for a file name match, as shown in box 703. The rules define the access rights that this or other users are given to the files being created by this user at this time. There can be two sets of rules, one the user sets up for access to the file both by that user and by other users of that file and a set of rules set up for access to the file prepared and modifiable only by the system administrator. It is important to note that in box 703 when a search for the rules is taking place, the rules that the user has defined for the user's file could include, for example, rules for that user for subsequent accesses to the file or could define rules for other users to have subsequent access to that file. If the file name is not found in the rules, then a label is not generated for the file, and the file is not encrypted, which is box 705.

On the other hand, if the file name is found in the rules that are defined for the user, which is box 704, this means that a label is to be established for this file and a standard label is generated and encrypted and prepared for the section at the front of the file. The key streams that were generated on boot up are used at this time for the encryption. In box 707 a default set of capabilities are copied to the label and in box 708 the integrity check for the standard capabilities is calculated and appended to the label. The precise number of capabilities transferred varies depending on other labeling requirements of the file.

In box 710 the user and privilege rights for a UUID defined in the rules are merged into a block referred to as a rights record or access control list (ACL) element and is written to the label. For each multiple of 16 UUID rights records, as shown in box 711, then in box 712, the integrity check for those sixteen records is calculated and appended to the label. Box 713 checks whether there are more UUIDs defined in the rules. If there are, then boxes 710, 711, 712 are iterated. If there are no more merged rights records from the file name matched rules, then box 714 checks again whether the last record set has already been integrity checked. If not, then an integrity check is calculated for that remaining record by box 715 and appended to the label. Then the entire label is encrypted using the DAC encryption streams which were generated on boot up.

Figure 8A:
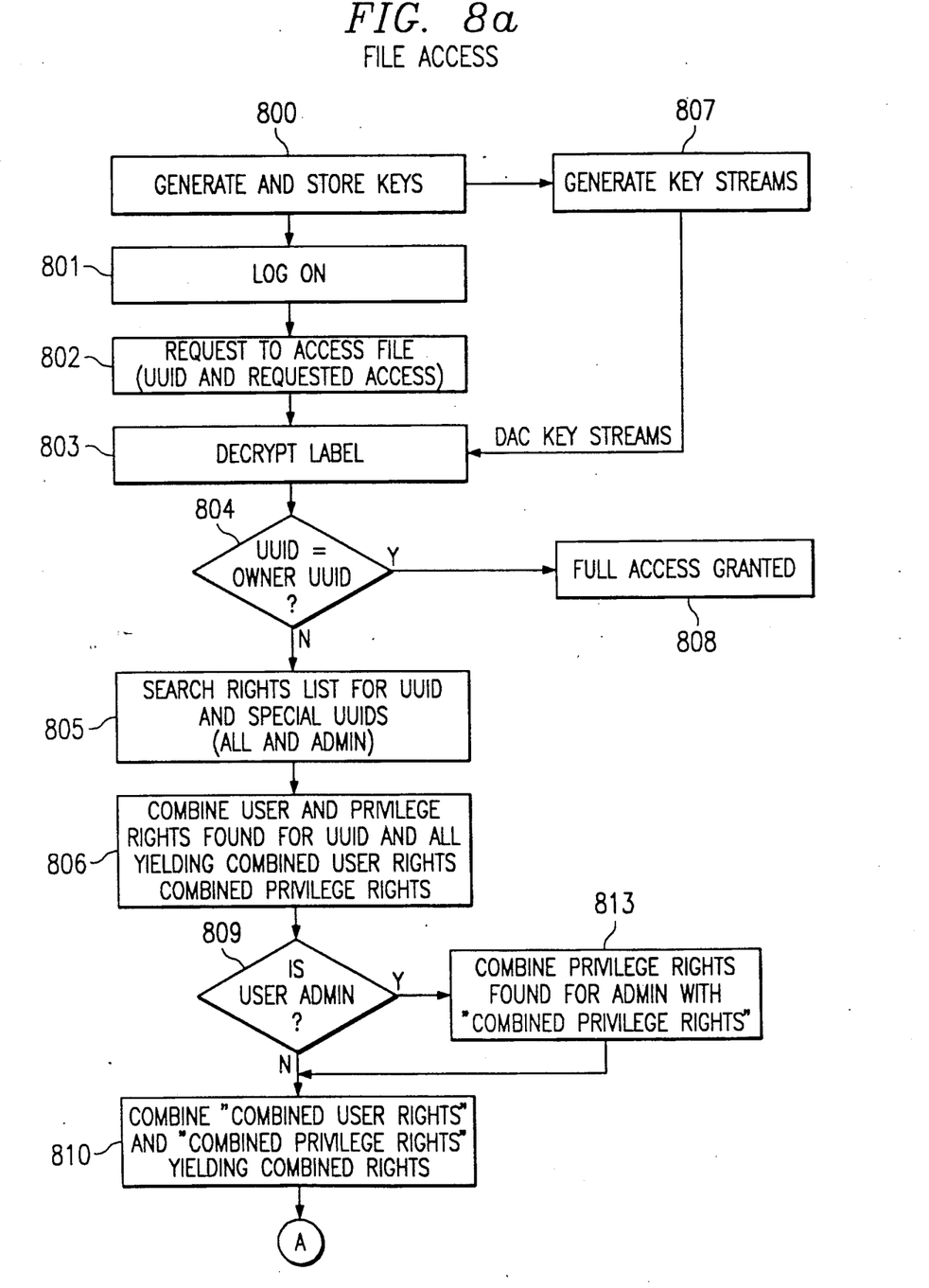
FIGS. 8A and 8B show an embodiment of a file access algorithm.

Turning now to FIG. 8A, there is shown the file access algorithm wherein at system boot up, box 800, the encryption keys are generated and stored and also the streams are generated at this time in box 807. In box 801 the user logs onto the system establishing a UUID. Later on, in box 802, the user performs a request and desires access to a file. What is needed for this request to access a file is: the user UUID which has been established at log on in box 801; and the type of access, such as read or write or delete, etc.

In box 803 the label of the file is decrypted using the DAC key streams which are generated at boot up in box 807. Inside the decrypted label is the UUID of the owner of the file. In box 804 the UUID of the user that is logged on is compared against this owner's UUID. If they match, then in box 808, he is granted full access to the file. If they do not match, then in box 805 the rights list of the file is searched for this user's UUID, and two special UUIDs which are defined. One of these special rights is for any rights that are defined for all users, and the other is for administration which are rights which are defined for administration users. Upon the completion of the search the user and privilege rights found for the UUID and all UUID are combined, box 806, yielding a combined user rights and a combined privilege rights. Then in box 809 the system checks to see if the user is an administrator. If so, then in box 813, the system combines the privilege rights found for the administration UUID with the combined privilege rights that are already established. Then in box 810 the combined user rights and the combined privilege rights yield a single rights list that the user has for this file.

Figure 8B:
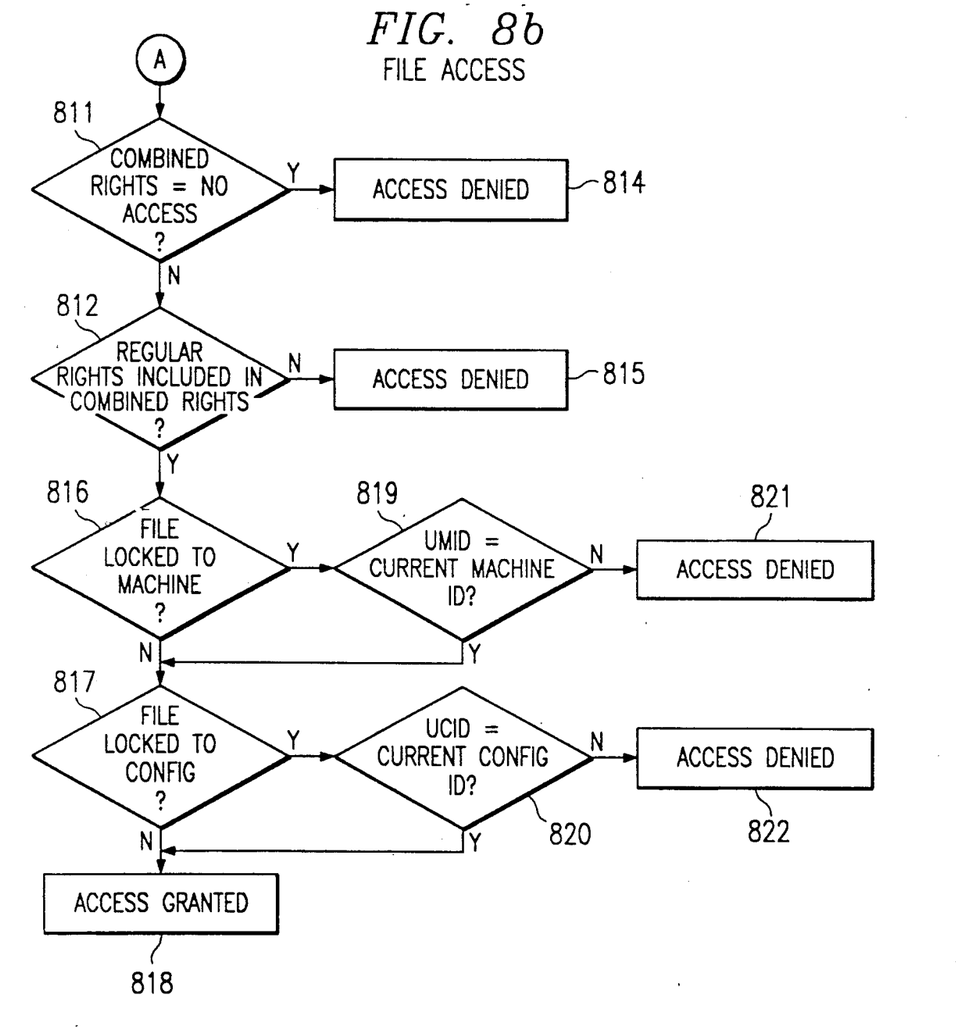

As shown in FIG. 8B Box 811 checks the combined rights that are established in the file to determine if the no access is set. If it is set, then in box 814, access is denied to this file. If it is not set, then in box 812 a check is made to see if the requestor rights are included in the combined rights that are established for this user for this file. If the requested rights are not a subset of those combined rights, then access to the file is denied in box 815. If the requested rights are a subset of the combined rights, then the system goes on and the rights are checked to see if this file is locked to a particular machine. If the rights indicate in box 816 that the file is locked to a machine, then the UMID, which is defined in the label, is compared in box 819 to the current machine I.D. The UMID is defined in the capabilities section of the label. If they do not match, then in box 821, access is denied to the file. If they do match, then the system continues on to box 817, where the rights established for the user for this file are checked to see if the file is locked to a particular configuration. If the file is locked, then in box 820, the system compares the UCID, the unique configuration I.D., against the current configuration I.D. of the system. If these do not match, then in box 822, access is denied to the file. If the UCID does match the current configuration I.D., then access is granted to the file.

Returning for a moment back to box 806, where the user and privilege rights are combined for the UUID yielding combined user rights and combined privilege rights. This combination is performed to minimize the rights between the user rights and the privilege rights yielding a minimum of the two rights. In box 806 we maximize the rights there to make sure that all the rights defined for the UUID or all the UUID are included. In box 810 the system combines the user rights and the privilege rights, to be most restrictive to the file by taking the minimum of the two rights because that is where this system actually gives the rights to the file for the user.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A method of cryptographically labeling a data file of electronically stored data comprising the steps of:
    generating a file label comprising a first field containing control variables for encrypting and decrypting said data file;
    generating at least one other field of said label, said field having portions to identify individual users and portions to identify the rights unique to each said user;
    prefixing said label to the file;
    encrypting the file in accordance with the control variables in said first field; and
    allowing access to said file for any user only in accordance with said rights preidentified in a field of said file identified with said user.

2. The method set forth in claim 1 further comprising the step of:
    adding a portion to said other field associated with each identified user identifying rights assigned to said user by a system in which said data is being stored.

3. The method set forth in claim 2 further comprising the step of:
    generating a field of said label for controlling at least one alternate encryption/decryption technique for said associated file.

4. The method set forth in claim 1 further comprising the step of:
    adding a portion to said other field associated with each identified user identifying rights assigned to said user by another user.

5. The method set forth in claim 1 further comprising the steps of:
    encrypting said first field of said label in accordance with further control variables in a second field of said label.

6. The method set forth in claim 1 further comprising the steps of:
    providing a system for encrypting and decrypting the data file, wherein said encrypting is accomplished by using a reversible function.

7. A system for cryptographically labeling a data file of electronically stored data comprising:
    means for generating a file label comprising a first field containing control variables for encrypting and decrypting said data file;
    means for generating at least one other field of said label, said field having portions to identify individual users and portions to identify the rights unique to each said user;
    means for prefixing said label to the file;
    means for encrypting the file in accordance with the control variables in said first field; and
    means for allowing access to said file for any user only in accordance with said rights preidentified in a field of said file identified with said user.

8. The system set forth in claim 7 further comprising:
    means for adding a portion to said other field associated with each identified user's identifying rights assigned to said user by a system in which said data is being stored.

9. The system set forth in claim 8 further comprising:
    means for generating a field of said label for controlling at least one alternate encryption/decryption technique for said associated file.

10. The system set forth in claim 9 further comprising:
    means for encrypting said first field of said label in accordance with further control variables in a second field of said label.

11. The system set forth in claim 10 further comprising:
    means for encrypting and decrypting the data file, wherein said encrypting is accomplished by a reversible function.

12. The system set forth in claim 7 further comprising:
    means for adding a portion to said other field associated with each identified user identifying rights assigned to said user by another user.

13. A system for encryption of a data file, said system comprising:
    means for generating a label for storage with each said data file;
    said label having an expandable field for controlling encryption and decryption of data to and from said file, said expandable field including:

at least one user identification portion and a user rights portion associated with each said user identification portion; said user rights portion created under control of said user; and a user privileges portion associated with each said user; said user privileges portion created independent of said user.

14. The system set forth in claim 13 wherein said user rights portion includes means for establishing the decryption technique to be used with any particular data file.

15. A security system for use with data processing systems where labels are associated with each data file, said system including:

means for establishing in a field of each said label, on a data file by data file basis, a unique identification of the encryption/decryption technique to be used with said file;

means for encrypting and decrypting a particular data file in accordance with the encryption/decryption technique specified in said label associated with said data file; and means for controlling said established field by a creator of said data file.

16. A computer system including a CPU and a memory having files stored therein and accessible by at least one user, said system including an arrangement for controlling access to said files, said arrangement including cryptographically labeling a file of electronically stored data comprising:

means for generating a file label comprising a first field containing control variables for encrypting and decrypting said file;

means for generating at least one other field of said label, said field having portions to identify individual users and portions to identify the rights unique to each said user;

means for prefixing said label to the file;

means for encrypting the file in accordance with the control variables in said first field; and means for allowing access to said file for any user only in accordance with said rights preidentified in a field of said file identified with said user.

17. The system set forth in claim 16 further comprising:

means for adding a portion to said other field associated with each identified user's identifying rights assigned to said user by a system in which said data is being stored.

18. The system set forth in claim 16 further comprising:

means for generating a field of said label for controlling at least one alternate encryption/decryption technique for said associated file.

19. The system set forth in claim 16 further comprising:

means for adding a portion to said other field associated with each identified user identifying rights assigned to said user by another user.

* * * * *